United States Patent
Yoshida et al.

(10) Patent No.: US 7,379,917 B2
(45) Date of Patent: May 27, 2008

(54) PRINTING CONTROL APPARATUS AND A METHOD OF CHARGING FOR PRINTING

(75) Inventors: Tomoya Yoshida, Hachioji (JP); Kazuhiro Takemoto, Hino (JP); Tetsuo Kimoto, Hachioji (JP); Kei Yamada, Hachioji (JP); Kunio Shijo, Hachioji (JP)

(73) Assignee: Konica Corporation, Tokyo (JP)

( * ) Notice: Subject to any disclaimer, the term of this patent is extended or adjusted under 35 U.S.C. 154(b) by 824 days.

(21) Appl. No.: 10/201,667

(22) Filed: Jul. 23, 2002

(65) Prior Publication Data

US 2003/0030835 A1 Feb. 13, 2003

(30) Foreign Application Priority Data

Aug. 7, 2001 (JP) ............................. 2001-239744

(51) Int. Cl.
*G06F 17/60* (2006.01)

(52) U.S. Cl. ............................. 705/52; 705/1; 705/51; 705/67; 726/2; 726/26; 726/27; 902/1

(58) Field of Classification Search .................. 705/64, 705/52, 67, 50
See application file for complete search history.

(56) References Cited

U.S. PATENT DOCUMENTS

2002/0186408 A1* 12/2002 Nakaoka et al. ........... 358/1.15

* cited by examiner

*Primary Examiner*—Andrew J. Fischer
*Assistant Examiner*—John Winter
(74) *Attorney, Agent, or Firm*—Frishauf, Holtz, Goodman & Chick, P.C.

(57) ABSTRACT

The image forming apparatus, for printing print data, and a printing control apparatus, for controlling a printing operation of the image forming apparatus, are connected through a network. In the printing control apparatus, there are provided an authentication means that authenticates a user of the image forming apparatus, a discriminating means that discriminates whether print data for which the printing is instructed by the authenticated user is for public business or for private business, a recording means that records information relating to printing of print data as private business information corresponding to the user when the print data are discriminated by the discriminating means to be for private business and a charging means that charges for private business printing of the user based on the private business information recorded on the recording means.

9 Claims, 6 Drawing Sheets

PUBLIC BUSINESS/PRIVATE BUSINESS
DISCRIMINATING KEYWORD DB 61

| URL | PUBLIC BUSINESS KEYWORD |
|---|---|
| http://aaa··· | NEWS RELEASE |
| http://bbb··· | PRODUCT INFORMATION |
| ⋮ | ⋮ |

FIG. 4

PRINTING HISTORY TABLE 62

| USER NAME | APPLICATION NAME | PRINTED PAGE | COLOR/ MONOCHROMATIC | SHEET SIZE | PRINTING START TIME | PRINTER NAME (FOR EACH ASSIGNED DEPARTMENT) | PRINTED DOCUMENT NAME | NUMBER OF PRINTS | AUTHENTICATION |
|---|---|---|---|---|---|---|---|---|---|
| ICHIRO SUZUKI | APPLICATION A1 | 1 | MONOCHROMATIC | OTHERS | 00/08/07 17:42:42 | GROUP G1 | NOTICE OF OFFICIAL TRIP | 1 | |
| ICHIRO SUZUKI | APPLICATION A1 | 1 | MONOCHROMATIC | OTHERS | 00/08/07 17:47:27 | GROUP G1 | NOTICE OF OFFICIAL TRIP | 1 | |
| TARO YAMADA | APPLICATION A2 | 1 | MONOCHROMATIC | A4 SHEET | 00/08/07 18:00:09 | GROUP G2 | MATERIALS OF XX | 1 | |
| TARO YAMADA | APPLICATION A3 | 7 | MONOCHROMATIC | A4 SHEET | 00/08/07 18:01:01 | GROUP G2 | XX | 1 | |
| TARO YAMADA | APPLICATION A4 | 1 | MONOCHROMATIC | A4 SHEET | 00/08/08 15:42:14 | GROUP G2 | LEASE INFORMATION | 1 | |
| ... | ... | ... | ... | ... | ... | ... | ... | ... | ... |

62a 62b 62c 62d 62e 62f 62g 62h 62i 62j

PUBLIC BUSINESS TABLE 63

| PRINTER NAME (DEPARTMENT NAME) | ACCOUNT | PRINT COUNT | TOTAL NUMBER OF PRINTED PAGES | NUMBER OF UNFINISHED COPIES |
|---|---|---|---|---|
| GROUP G1 | **** | 10000 | 500 | 9500 |
| GROUP G2 | **** | 20000 | 1000 | 19000 |
| ⋮ | ⋮ | ⋮ | ⋮ | ⋮ |

PRIVATE BUSINESS TABLE 64

| USER NAME | PRINT COUNT | TOTAL NUMBER OF PRINTED PAGES | NUMBER OF UNFINISHED COPIES |
|---|---|---|---|
| ICHIRO SUZUKI | 100 | - | 100 |
| TARO YAMADA | 100 | 1 | 99 |
| ⋮ | ⋮ | ⋮ | ⋮ |

PRINTING CONTROL APPARATUS AND A METHOD OF CHARGING FOR PRINTING

BACKGROUND OF THE INVENTION

The present invention relates to a printing control apparatus that controls printing of print data in accordance with printing instructions, and to a charging method therefor.

In general, printers installed in companies and schools are connected to a network such as LAN, and are shared by a plurality of terminals to be used. In this case, a server connected to the network controls printing conducted by a plurality of terminals.

However, since contents of data printed by plural terminals have not been administered by the server, it has been impossible for the server to detect that each user in plural terminals uses a printer on private business, thus, there has been a possibility that the fees for printing in the aforementioned occasion are included in expenses for the companies and schools.

SUMMARY OF THE INVENTION

An object of the invention is that an image forming apparatus (for example, a printer) which is shared in companies or schools can discriminate between an occasion where the image forming apparatus is used on private business and an occasion where it is used on public business, so that fees for printing in the case where the printing apparatus was used by a user on private business may not be included in expenses for the companies or schools.

For achieving the aforementioned object, the invention has the following characteristics.

In the image forming apparatus printing print data and a printing control apparatus that is connected through a network, the invention is characterized to have an authentication means that authenticates a user of the image forming apparatus, a discriminating means that discriminates whether print data for which the printing is instructed by the authenticated user is for public business or for private business, a recording means that records information relating to printing of print data as private business information corresponding to the user when the print data are discriminated by the discriminating means to be for private business and a charging means that charges for private business printing of the user based on the private business information recorded on the recording means.

Further, the invention is a charging method in the printing control apparatus that is connected, through a network, with an image forming apparatus that prints print data, wherein an authentication step that authenticates a user of the image forming apparatus, a discriminating step that discriminates whether print data for which the printing is instructed by the authenticated user is for public business or for private business, a recording step that records information relating to printing of print data as private business information corresponding to the user when the print data are discriminated by the discriminating means to be for private business and a charging step that charges for private business printing of the user based on the private business information recorded on the recording means, are included.

In the invention, when print data for which the printing is instructed by the authenticated user is for private business, fees for private printing are charged for the user. It is therefore possible to make the printing fees for private printing not to be included in expenses for companies or schools. Therefore, it is possible for companies and schools to promote a tendency to electronic document and to reduce unnecessary fees for printing.

In the printing apparatus, the invention is characterized in that a addition means that adds authentication information to the print data is provided, and the discriminating means discriminates the-print data whether they are for public business or for private business, based on the authentication information added by the addition means.

In the invention, print data are discriminated whether they are for public business or for private business based on authentication information supplied to the print data, which makes it easy to discriminate print data whether they are for public business or for private business.

In the printing apparatus, the invention is characterized in that a public business data storage means that stores print data for public business is provided, and the discriminating means discriminates the print data whether they are for public business or for private business based on whether the print data are stored in the public business data storage means or not.

In the invention, a storage location for storing print data for public business is provided, therefore, if print data are stored in this storage location, the print data can be discriminated to be print data for public business. Namely, print data can easily be discriminated whether they are for public business or for private business.

In the printing apparatus, the invention is characterized to provide an analysis means that analyzes key words included in the print data or location information appointed for the print data, and the discriminating means discriminates the print data whether they are for public business or for private business, based on the results of analysis conducted by the analysis means.

In the invention, print data are discriminated whether they are for public business or for private business based on key words included in print data. It is therefore easy to discriminate.

In the printing apparatus, the invention is characterized to provide an approval means that approves the print data based on the results of discrimination conducted by the discriminating means, and the recording means records information relating to print data approved by the approval means as information for public business for the user.

In the invention, print data are approved after the print data are discriminated whether they are for public business or for private business, and the approved print data are recorded as information for private business. It is therefore possible to record information for private business accurately.

In the printing apparatus of the invention, the recording means mentioned above is characterized to record the number of printed sheets of the print data as information for the private business.

In the invention, the number of printed sheets of the print data is recorded as information for the private business. It is therefore possible to charge a user accurately.

In the printing control apparatus, the invention is characterized to provide a fingerprint reading means that reads fingerprints of a user of the image forming apparatus and a fingerprint storage means that stores the fingerprints read by the fingerprint reading means so that the fingerprints read may correspond to the user, and the authentication means stated above authenticates the user by retrieving the fingerprints of the user from the fingerprint storage means.

In the invention, a user of the image forming apparatus is discriminated by fingerprints, and the user can be authenticated accurately accordingly.

BRIEF DESCRIPTION OF THE DRAWINGS

FIG. 4 is a diagram showing an example of data storage of a printing history table.

DETAILED DESCRIPTION OF THE INVENTION

Figure 1:
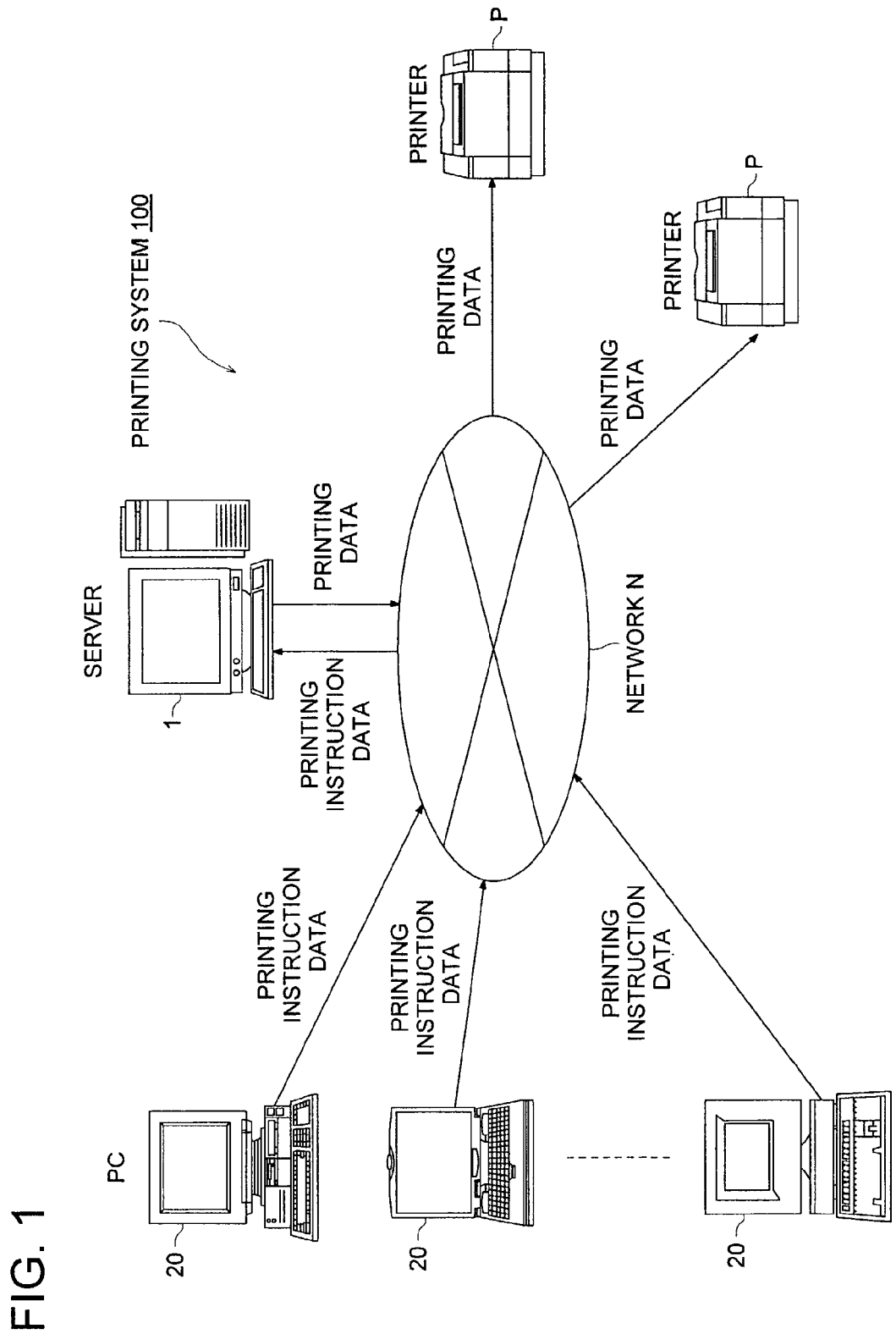
FIG. 1 is a schematic view showing the overall structure of the printing system in the present embodiment.

An embodiment of the invention will be explained in detail as follows, referring to the drawings.

First, the structure will be explained. FIG. 1 is a schematic view showing the overall structure of printing system 100 in the present embodiment. As shown in FIG. 1, one unit of server 1, two units of printer P and n units of PC 20 are connected through network N so that transmitting and receiving as well as inputting and outputting of data may be conducted in the printing system 100.

In the following explanation, document data and image data prepared by PC 20 through the application software are named the printing instruction data generically. On the other hand, scripts which are prepared by server 1, with prescribed page descriptive language, by converting into a data form that can be printed by the printer P are named the printing data, so that a line is drawn between the aforementioned two types of data.

The server 1 is, for example, a print server that is for the purpose of holding printers P in common on the network N. In the server 1, there is stored NOS (Network Operating System) in which the printing data are generated based on printing instruction data transmitted from PC 20, and the printing data are spooled (Simultaneous Peripheral Operation On-Line) to be outputted to the printer P. Incidentally, the server 1 includes also one that serves concurrently as a file server.

The network N is an information communication network such as LAN (Local Area Network) built in buildings of companies or schools and WAN (Wide Area Network). A line form is optional, though the ring-shaped line form is illustrated. Further, connection between peripherals may be of either the wire system or the wireless system. However, from the viewpoint of reliability of information management, it is preferable to have the network wherein securities enabling specific users to access are ensured. The network N includes, for example, a concentrator such as a hub equipped with a prescribed number of ports, in addition to a relay device such as a router that conducts analyses of data to be transmitted or received, establishment of a transmission path and conducts transferring.

Figure 2:
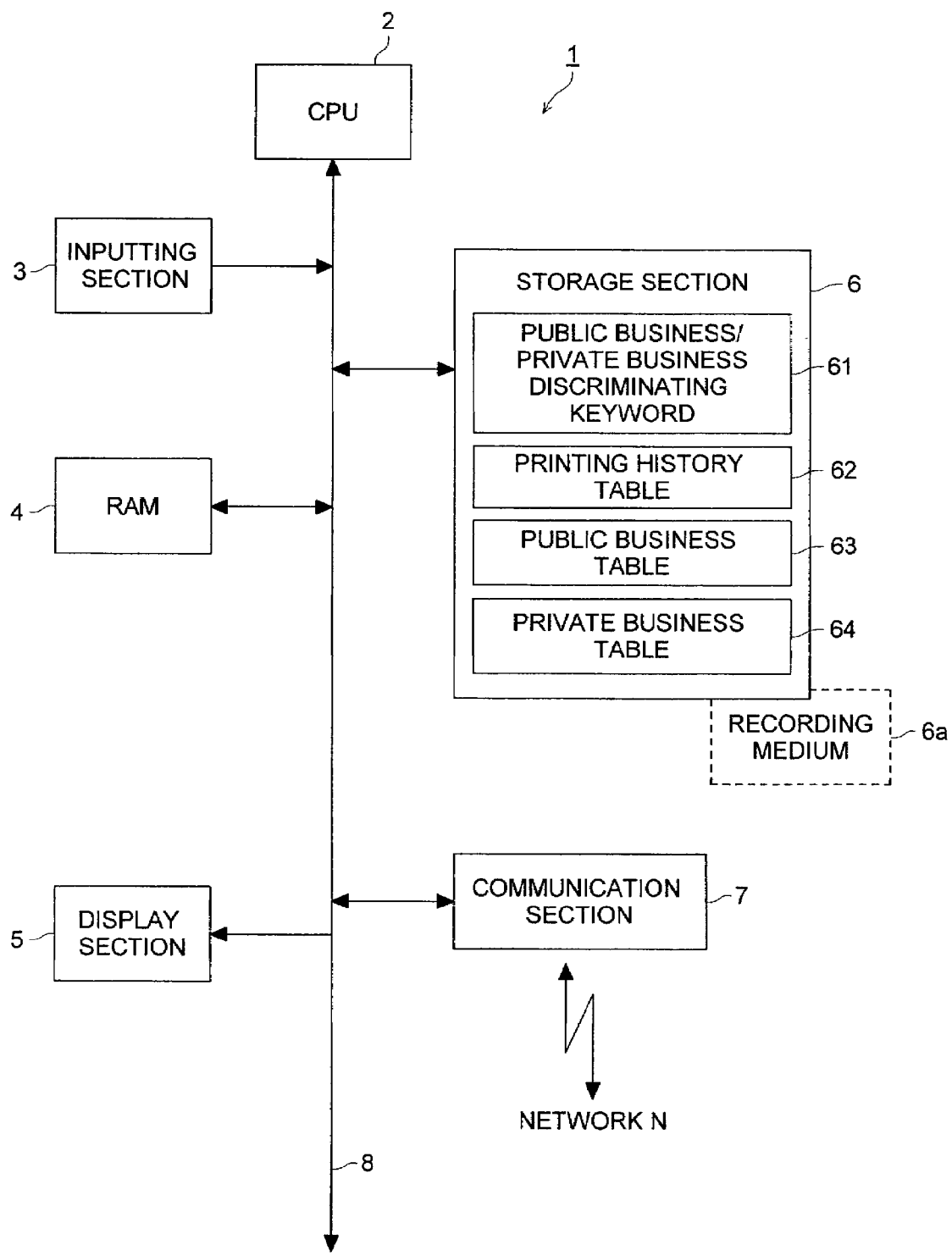
FIG. 2 is a block diagram showing a functional structure of server 1.

An internal structure of the server 1 will be explained in detail as follows, referring to FIG. 2. FIG. 2 is a block diagram showing the functional structure of the server 1. As shown in FIG. 2, the server 1 is a computer composed of CPU 2, inputting section 3, RAM 4, display section 5, storage section 6 having recording medium 6a and of communication section 7 which are connected by bus 8 with the exception of the recording medium 6a.

CPU (Central Processing Unit) 2 reads programs stored in storage section 6 to develop them in RAM 4, and controls each section intensively in accordance with the programs. Namely, CPU 2 executes printing processing described later, in accordance with the programs developed in RAM 4, then, stores results of the processing in RAM 4, and makes display section 5 to display them. Then, CPU 2 makes the results of the processing stored in RAM 4 to be saved in storage section 6 or in a prescribed area inside recording medium 6a.

Figure 5:
FIGS. 5(a) and 5(b) are diagrams showing examples of data storage for a public business table and a private business table.
Figure 5:

Further, in printing processing (see FIG. 6) described later, CPU 2 outputs printing data to one printer P specified by a user of PC 20 among two printers P, then, generates printing histories when the printing data stated above are printed, and stores them in printing history table 62 (see FIG. 4). Then, based on this printing history (printed document name in this case), CPU 2 discriminates the printing data whether they are for public business or for private business, and stores data (a part of the printing history) corresponding to the discriminated printing data, by dividing into public business table 63 (see FIG. 5(a)) and private business table 64 (see FIG. 5(b)). Then, CPU 2 conducts charging processing for each individual based on the printing history registered in private business table 64.

In other words, CPU 2 has functions of an identifying means, a discriminating means and a charging means, in this case.

When the printing data are of Web contents in the case of discriminating printing data whether they are for public business or for private business, CPU 2 acquires a keyword such as URL and a tile of contents. Then, it judges whether the acquired keyword is stored in keyword DB 61 for discriminating public business/private business or not. In other words, CPU 2 has a function as an analysis means to analyze whether the acquired keyword is stored or not.

Further, when the printing data are neither an approved document nor Web contents corresponding to the keyword registered in keyword DB 61 for discriminating public business/private business, CPU 2 discriminates the printing data whether they are for public business or not, by instruction inputting corresponding to judgment of an administrator who approves a document that is held by PC 20 in common.

In other words, instruction inputting corresponding to judgment of an administrator who approves a document that is held by PC 20 in common has a function as an approving means.

Inputting section 3 is composed of a keyboard equipped with a letter/numeral inputting key, a cursor control key and various functional keys and a mouse representing a pointing device equipped with a click button. The inputting section 3 outputs depression signals by the keyboard and operation signals by the mouse to CPU 2 as an input signal.

In each processing stated above that is controlled by CPU 2 in terms of execution, RAM (Random Access Memory) 4 forms a temporally storage area for the whole or a part of each type program and data which are read out of storage section 6 or recording medium 6a.

Display section 5 is composed of LCD (Liquid Crystal Display) or CRT (Cathode Ray Tube), and it displays display data on a screen, pursuant to the instruction of display signals inputted from CPU 2.

Storage section 6 is composed of a non-volatile memory such as HD (Hard Disc), and it stores various programs which can be executed by server 1, driver of printer P and data processed by the program. Further, storage section 6 has recording medium 6a mounted detachably, and the recording medium 6a is composed of a magnetic recording medium or an optical recording medium. The program is stored in a form of a programs code capable of being read by a computer, and CPU 2 executes successively operations in accordance with the program code.

Programs and data to be stored in storage section 6 may also be of the structure wherein a part or the whole of them are received by communication section 7 from other equipment through a transmission medium such as communication lines. On the contrary, the programs and data may also be of the structure wherein they are transmitted from communication section 7 through the transmission medium, and are installed in other equipment. Incidentally, the programs and data include those which are realized by a firmware that is integrated with a hardware of the computer.

Storage section 6 stores document control system program as a program. The document control system program supports preparation and processing, inspection processing and approval processing all for the document shared by n units of PC 20, and administrates the approved document. In this case, authentication information is granted to the approved document for the administration. In other words, the document control system stored in the storage section 6 in this case has a function as a granting means.

The storage section 6 is composed of keyword DB (Data Base) 61 for discriminating between public business/private business described later, printing history table 62, public business table 63 and private business table 64 which are provided in the storage section in an updatable file form. Examples of data storage inside the storage section 6 will be explained as follows, referring to FIG. 3-FIG. 5.

Figure 3:
FIG. 3 is a diagram showing an example of data storage of discrimination key word DB for public business/private business.

In FIG. 3, there is shown an example of data storage of keyword DB 61 for discriminating between public business/private business. As shown in FIG. 3, URL (Uniform Resource Locator) that is marked when printing Web contents and a public business keyword showing a title of Web contents used for public business are stored in a way to correspond each other in the keyword DB 61 for discriminating between public business/private business. In the example of data storage in FIG. 3, there are stored "http://aaa . . . " and "http://bbb . . . " both representing URL, and there are stored "news release" and "product information" both representing public business keywords. Therefore, URL indicates the location of the object for printing on the network. The present invention discriminates between public business/private business in accordance with the location information of the object for printing.

FIG. 4 shows an example of data storage of printing history table 62. As shown in FIG. 4, "user name" item 62a, "application name" item 62b, "printed page" item 62c, "color/monochromatic" item 62d, "sheet size" item 62e, "printing start time" item 62f, "printer name (for each assigned department)" item 62g, "printed document name" item 62h, "number of prints" item 62i and "authentication" item 62j are set on the record of printing history table 62, and printing histories of printer P collected in printing processing (see FIG. 6) described later are stored. On the "user name" item 62a, in this case, there is stored a user name which is on the log-on to PC 20, for example, while, on the items 62b-62i, there are stored instruction information instructed from PC 20, and on item 62j, there is stored authentication information granted to the document by the document administration system.

An example of data storage of public business table 63 is shown in FIG. 5(a). As shown in FIG. 5(a), a "printer name (department name)" item, an "account" item, a "print count" item, a "total number of printed pages" item and a "number of unfinished copies" item are set on the public business table 63, and data corresponding to each item are assigned and stored.

In this case, the "printer name (department name)" item, the "account" item and the "print count" item are established in advance. Further, in printing processing (see FIG. 6) described later, the "total number of printed pages" item and the "number of unfinished copies" item both established for each printer (namely, for each department) are updated, when printing data are for public business.

In an example of data storage in FIG. 5(a), "group G1" representing the printer name (department name), "****" representing the account, "10000" representing the print count, "500" representing the total number of printed pages and "9500" representing the number of unfinished copies are stored.

An example of data storage of private business table 64 is shown in FIG. 5(b). As shown in FIG. 5(b), a "user name" item, a "print count" item, a "total number of printed pages" item and a "number of unfinished copies" item are set on private business table 64, and data corresponding to each item are assigned and stored.

In this case, the "user name" item and the "print count" item are established in advance. Further, in printing processing (see FIG. 6) described later, the "total number of printed pages" item and the "number of unfinished copies" item both established for the user who used the printer are updated, when printing data are for private business.

In other words, the private business table 64 in this case has a function as a recording means.

In an example of data storage shown in FIG. 5(b), "Ichiro Suzuki" representing the user name, "100" representing the print count, "-" representing the total number of printed pages and "100" representing the number of unfinished copies are stored.

Communication section 7 is composed of a communication control card such as a LAN card, and it conducts transmitting and receiving as well as inputting and outputting of various data between PC 20 and printer P both connected to network N through communication lines such as LAN cables.

There has been explained the structure of the server 1 corresponding to the printing control apparatus relating to the invention. With respect to PC 20, on the other hand, illustration and explanation of the structure thereof will be omitted here, because the primary portions of PC 20 are the same in terms of structure as those of the server 1.

Printer P is a printing apparatus that conducts printing for printing data described in a prescribed page descriptive language. The printer P is equipped with a sheet feeding section where continuous sheet or cut sheets are loaded as printing sheet and a sheet ejection section, and it transfers printing data inputted from server 1 through network N on the aforementioned printing sheet through the electrophotographic method employing an infrared laser beam or light emitted from LED (Light-Emitting Diode), and ejects the sheet for outputting.

Next, operations will be explained as follows.

As a prior condition for the explanation of operations, a program for realizing each processing described in the following flow chart is stored in storage section 6 in a form of the program code which can be read by a computer, and CPU 2 conducts successively the operations complying with the program code. Further, it is also possible for CPU 2 to conducts successively the operations which are specific to the present embodiment, by utilizing a program and data supplied from the outside through transmission media.

First, printing processing conducted by server 1 will be explained, referring to the flow chart in FIG. 6.

Figure 6:
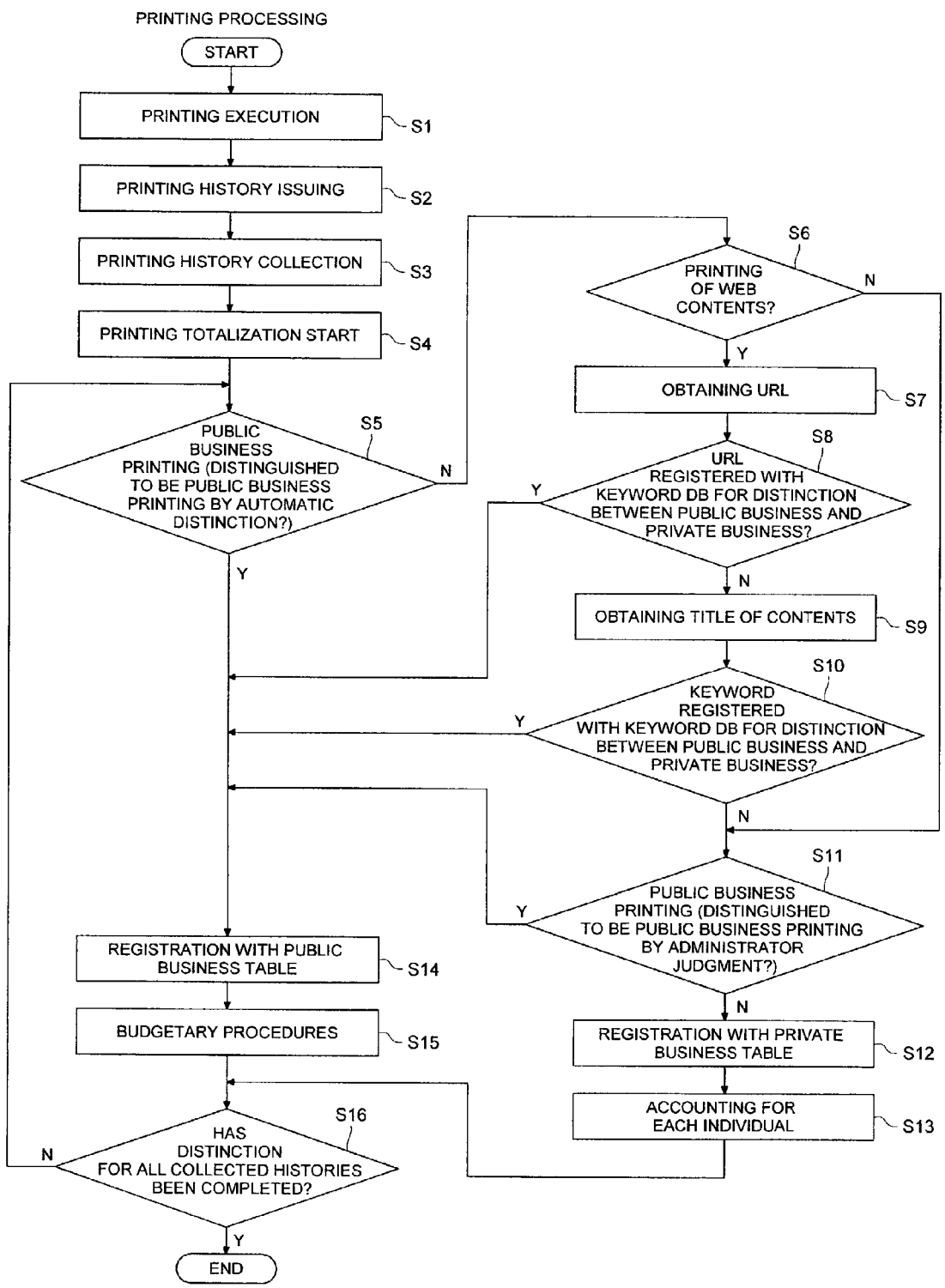
FIG. 6 is a flow chart showing a flow of printing processing executed by server 1.

In FIG. 6, CPU 2 of server 1 generates printing data based on printing instruction data sent from PC 20, then, spools the printing data and outputs them to printer P specified by PC 20 (step S1). In this case, CPU 2 generates printing histories (step S2), and collects information for items 62a-62j of printing history table 62 (see FIG. 4) to store them (step S3).

Then, CPU 2 starts collecting printing histories (step S4), and initiates a document control system program to discriminate printing data whether they are administrated as an approved document or not (step S5).

In this case, if the printing data are administrated as an approved document, namely, if the printed document name is administrated, CPU 2 discriminates that the printing data are for public business (step S5; Yes), and moves on to step S14.

If the printing data are not administrated as an approved document, namely, if the printed document name is not administrated, CPU 2 discriminates that the printing data are not for public business, namely, that the printing data are for private business or they are undiscriminating (when it is impossible to discriminate between "public business" and "private business") (step S5; No), and further discriminates the printing data whether they are Web contents or not (step S6).

If the printing data are Web contents in this case (step S6; Yes), URL is acquired (step S7), and when the acquired URL is one registered in keyword DB 61 for discriminating between public business/private business (step S8; Yes), the printing data are discriminated to be for public business, and the flow moves on to step S14.

Further, when URL acquired in step S7 is not URL registered in keyword DB 61 for discriminating between public business/private business (step S8; No), a title of contents is further acquired (step S9), and when the title of contents thus acquired is registered in keyword DB for discriminating between public business/private business (step S10; Yes), the printing data are discriminated to be public business, and the flow moves on to step S14.

When the printing data are not Web contents (step S6; No), or when the acquired URL and a title of contents are not registered in keyword DB for discriminating between public business/private business (step S6; Yes→step S7→step S8; No→step S9→step S10; No), the flow moves to step S11, and CPU 2 discriminates the printing data whether they are for public business or for private business based on input of specification complying with discrimination of an administrator who approves a document shared on PC 20.

When the printing data are discriminated not to be public business (step S11; No), CPU 2 extracts "user name" and "number of printed pages" from printing histories of printing data, then, adds the extracted "number of printed pages" to "total number of printed pages" of private business table 64 corresponding to the aforesaid user name, then, subtracts the "total number of printed pages" from "print count" established on private business table 64 to calculates "number of unfinished copies", and thereby, CPU 2 updates each item of the private business table 64 and stores it (step S12), and conducts charging processing such as issuing contents established on private business table 64 as a bill for each individual (step S13), then, the flow moves on to step S16.

When the printing data are discriminated to be for public business in this case (step S11; Yes), the flow moves to step S14.

Then, CPU 2 extracts "printer name" and "number of printed pages" from printing histories of printing data, then, adds the extracted "number of printed pages" to "total number of printed pages" of public business table 63 corresponding to the aforesaid printer name, then, subtracts the "total number of printed pages" from "print count" established on public business table 63 to calculates "number of unfinished copies", and thereby, CPU 2 updates each item of the public business table 63 and stores it (step S14), and conducts budget processing based on public business table 63. The budget processing includes, for example, a transfer from the account registered on public business table 63 and a warning (for example, output of message) for an excess over the estimates (step S15).

Then, CPU 2 discriminates whether the discrimination for whether public business or private business has been completed or not for all of the printing histories collected in printing history table 62 (step S16), and if the discrimination has not been completed (step S16; No), the flow returns to step S5, while if the discrimination has been completed (step S16; Yes), the present printing processing is terminated.

As stated above, CPU 2 outputs printing data to printer P specified by PC 20 among two printers P, and when printing has been conducted for the aforementioned printing data, CPU 2 generates printing histories and stores them in printing history table 62 (see FIG. 4). Then, based on this printing history (printed document name in this case), the printing data are discriminated whether they are for public business or for private-business, and data (a part of printing histories) corresponding to the discriminated printing data are classified into public business table 63 (see FIG. 5(*a*)) and private business table 64 (see FIG. 5(*b*)) to be stored. Then, based on the data registered in the private business table 64, there is conducted charging processing such as issuing a bill for each individual.

Therefore, when a user uses a printer that is shared in companies or schools, charging for printing fees is conducted for each individual so that printing fees for private printing may not be included in expenses for companies or schools. Therefore, it is possible for companies or schools to promote a tendency to electronic document and to reduce unnecessary fees for printing.

Further, a user can utilize comfortable printing environment of companies or schools on a private business basis, which is a merit for the user.

Incidentally, in the present embodiment, each of n units of PC 20 identifies whether the document stored in a storage device in each unit is on public business or on private business. However, it is also possible to establish the storage location for printing instruction data (document) in advance, without being limited to the foregoing, and to discriminate the printing instruction data stored in the established storage location to be on the public business. In this case, the storage location thus established has a function as a storage means for public business data.

In the present embodiment, there has been explained an example of an occasion where printing histories of printing data generated based on printing instruction data transmitted from PC 20 are used. However, it is also possible to keep printing information (for example, a name of a person who prints and a name of printed document) executed by printer P and to use this printing information as a printing history, without being limited to the foregoing.

Further, in the present embodiment, there is no description about judgment to approve printing under the state of draft of a document to be approved or not. In this case, however, it is possible to register a path for approval for printing under the state of printing as a part of approval processing which can be executed by the document control system.

Further, in the present embodiment, there has been explained printer P connected to network N. However, the invention can be applied to also a copying machine and an image forming apparatus connected to the network N. In this case, it is possible to install a fingerprint reading means on the inputting section of a copying machine, for example, then, to register a fingerprint of a user on DB, and to identify an individual by comparing a fingerprint obtained through reading by a fingerprint reading apparatus with a fingerprint on DB. In this case, the fingerprint reading apparatus has a function as a fingerprint reading means, and DB has a function as a fingerprint storage means.

Further, in this case, information which can specify an individual such as, for example, a shape of an ear read by a scanner, a voiceprint inputted from a microphone, a discrimination number of a portable terminal or a cell phone of an individual and information of a position of a copying machine used normally by a user (for example, GPS information) may be registered in DB without being limited to the fingerprint, and thereby, an individual may be identified based on registered information. It is also possible to identify by utilizing user information registered on a user ID card or a non-contact type IC card. When identifying an individual in the aforesaid way, an individual may also be identified based on other information capable of identifying an individual, without being limited to the example stated above.

Though there has been explained an occasion wherein two printers P are connected to network N in the present embodiment, there is no restriction in the number of printers.

The invention is not limited to the contents of the aforementioned embodiment, and it is possible to modify within a range that does not exceed a scope of the invention. (0067).

In the invention, when printing data for which the printing is instructed by the authenticated user are on the private business, charging for printing on the private business is conducted for the user. Therefore, it is possible to make the printing fees for the private business not to be included in the expenses of companies or schools. Due to this, the companies or schools can promote a tendency to electronic document and to reduce unnecessary fees for printing.

In the invention, printing data are discriminated, based on authentication information granted to the printing data, whether they are on public business or on private business, which makes it easy to discriminate printing data whether they are on public business or on private business.

In the invention, a storage location for storing print data for public business is provided, therefore, if print data are stored in this storage location, the print data can be discriminated to be print data for public business. Namely, print data can easily be discriminated whether they are for public business or for private business.

In the invention, print data are discriminated whether they are for public business or for private business based on key words included in print data. It is therefore easy to discriminate.

In the invention, print data are approved after the print data are discriminated whether they are for public business or for private business, and the approved print data are recorded as information for private business. It is therefore possible to record information for private business accurately.

In the invention, the number of printed sheets of the print data is recorded as information for the private business. It is therefore possible to charge a user accurately.

In the invention, a user of the image forming apparatus is discriminated by fingerprints, and the user can be authenticated accurately accordingly.

What is claimed is:

1. A printing control apparatus for use via a network in a printing system having an image forming apparatus, said printing control apparatus, comprising:

an authentication section which authenticates a user who has instructed a printing operation to the image forming apparatus;

an analysis section which analyzes keywords included in print data corresponding to the printing operation instructed by the authenticated user;

a discriminating section which discriminates whether the print data is for public use or for private use, irrespective of a printer assigned as an output destination, based on a result of analysis conducted by the analysis section;

a recording section which records information relating to the printing operation as private use information corresponding to the user when the print data is discriminated by the discriminating section as being for private use; and a charging section which charges for the printing operation for private use based on the private use information.

2. A charging method, for use with an image forming apparatus and a printing control apparatus for controlling said image forming apparatus through a network, comprising:

authenticating a user of the image forming apparatus who has instructed a printing operation to the image forming apparatus;

analyzing keywords included in print data corresponding to the printing operation instructed by the authenticated user;

discriminating whether the print data is for public use or for private use, based on a result of the analysis of the keywords, irrespective of a printer assigned as an output destination;

recording information relating to the printing operation as private use information corresponding to the user when the print data is discriminated as being for private use; and charging for the printing operation for private use based on the private use information.

3. The printing control apparatus of claim 1, further comprising:

a keyword database which stores keywords;

wherein the discriminating section discriminates the print data as being for public use when the keywords analyzed by the analysis section match keywords stored in the keyword database.

4. The printing control apparatus of claim 3, further comprising:

an approval section to approve the print data based on a result of discrimination conducted by the discriminating section;

wherein the recording section records information relating to the printing operation as public use information corresponding to the user, when the approval section approves the print data.

5. The printing control apparatus of claim 4, wherein the private use information corresponding to the user that is recorded by the recording section includes a number of printed sheets of the print data.

6. The printing control apparatus of claim 5, further comprising:
a fingerprint reading section which reads fingerprints of the user; and
a fingerprint storage section which stores the fingerprints read by the fingerprint reading section such that the stored fingerprints correspond to the user;
wherein the authentication section authenticates the user by retrieving the fingerprints of the user from the fingerprint storage section.

7. A printer control apparatus, comprising:
a discriminating section which discriminates whether a printing operation requested by a user is for public use or private use, irrespective of a printer assigned as an output destination of the printing operation requested by the user; and
a charging section which charges the fee to the user or to a business unit based on the discrimination performed by the discriminating section.

8. The printer control apparatus of claim 7, further comprising an analysis section which analyzes information relating to a content to be printed, wherein the discriminating section discriminates whether the printing operation requested by the user is for public use or private use, based on a result of the analysis conducted by the analysis section.

9. The printer control apparatus of claim 8, wherein the information includes at least one of a file name of the content and a uniform resource locator of the content.

* * * * *